(12) United States Patent
Stevens

(10) Patent No.: US 6,168,202 B1
(45) Date of Patent: Jan. 2, 2001

(54) PYROTECHNIC INITIATOR WITH PETAL RETAINER STRUCTURE

(75) Inventor: Bruce A. Stevens, Mesa, AZ (US)

(73) Assignee: TRW Inc., Lyndhurst, OH (US)

( * ) Notice: Under 35 U.S.C. 154(b), the term of this patent shall be extended for 0 days.

(21) Appl. No.: 09/179,806

(22) Filed: Oct. 27, 1998

(51) Int. Cl.⁷ .................................................. B60R 21/26
(52) U.S. Cl. ............................................ 280/737; 280/741
(58) Field of Search .................................. 280/737, 736, 280/741, 742

(56) References Cited

U.S. PATENT DOCUMENTS

| | | | |
|---|---|---|---|
| 5,031,932 | * 7/1991 | Frantom et al. ...................... | 280/741 |
| 5,494,312 | * 2/1996 | Rink ...................................... | 280/737 |
| 5,558,367 | * 9/1996 | Cuevas .................................. | 280/737 |
| 5,582,426 | * 12/1996 | O'Loughlin et al. ................. | 280/741 |
| 5,601,308 | * 2/1997 | Cuevas .................................. | 280/736 |
| 5,607,181 | * 3/1997 | Richardson et al. ................. | 280/737 |
| 5,615,912 | * 4/1997 | O'Loughlin et al. ................. | 280/737 |
| 5,636,865 | 6/1997 | Riley et al. . | |
| 5,645,298 | 7/1997 | Stevens et al. . | |
| 5,673,934 | * 10/1997 | Saccone et al. ...................... | 280/737 |
| 5,762,368 | * 6/1998 | Faigle et al. ......................... | 280/737 |
| 5,794,973 | * 8/1998 | O'Loughlin et al. ................. | 280/737 |
| 5,799,969 | 9/1998 | Coleman et al. . | |
| 5,803,494 | * 9/1998 | Headley ............................... | 280/741 |
| 5,992,881 | * 11/1999 | Faigle ................................... | 280/737 |
| 6,012,737 | * 1/2000 | Van Wynsberghe et al. ....... | 280/737 |

* cited by examiner

Primary Examiner—Paul N. Dickson
Assistant Examiner—Deanna Draper
(74) Attorney, Agent, or Firm—Tarolli, Sundheim, Covell, Tummino & Szabo L.L.P.

(57) ABSTRACT

An apparatus (10) includes an initiator (14) having a casing (42) containing a charge of pyrotechnic material (44). An end wall (58) of the casing (42) has score lines (72) delineating petal shaped sections (74) of the end wall (58). The petal shaped sections (74) of the end wall (58) are configured to diverge by deflecting pivotally upon rupturing of the end wall (58) along the score lines (72) under the influence of the pyrotechnic material (44). The apparatus (10) further includes a petal retainer structure (50) having a retainer surface (80). The retainer surface (80) is configured to receive the petal shaped sections (74) of the end wall (58) so as to limit pivotal deflection of the petal shaped sections (74) to amounts less than 90 degrees. The petal retainer structure (50) is thus configured to inhibit fragmentation of the end wall (58) that might otherwise occur upon greater pivotal deflection of the petal shaped sections (74).

11 Claims, 2 Drawing Sheets

US 6,168,202 B1

PYROTECHNIC INITIATOR WITH PETAL RETAINER STRUCTURE

FIELD OF THE INVENTION

The present invention relates to a pyrotechnic initiator which is actuatable to initiate a flow of inflation fluid from an inflator to an inflatable vehicle occupant protection device.

BACKGROUND OF THE INVENTION

An inflator for an inflatable vehicle occupant protection device, such as an air bag, may have a chamber containing pressurized inflation fluid. The chamber is closed by a rupturable closure disk. The inflator further has an electrically actuatable initiator containing a charge of pyrotechnic material. When the initiator is actuated, the pyrotechnic material generates combustion products that are spewed from the initiator to the closure disk to rupture the closure disk and thereby to open the chamber. The inflation fluid then flows outward from the chamber to inflate the protection device.

SUMMARY OF THE INVENTION

In accordance with the present invention, an apparatus comprises an initiator having a casing containing a charge of pyrotechnic material. An end wall of the casing has score lines delineating petal shaped sections of the end wall. The petal shaped sections of the end wall are configured to diverge by deflecting pivotally upon rupturing of the end wall along the score lines under the influence of the pyrotechnic material.

The apparatus further comprises a petal retainer structure having a retainer surface. The retainer surface is configured to receive the petal shaped sections of the end wall so as to limit pivotal deflection of the petal shaped sections to amounts less than 90 degrees. The petal retainer structure is thus configured to inhibit fragmentation of the end wall that might otherwise occur upon greater pivotal deflection of the petal shaped sections.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
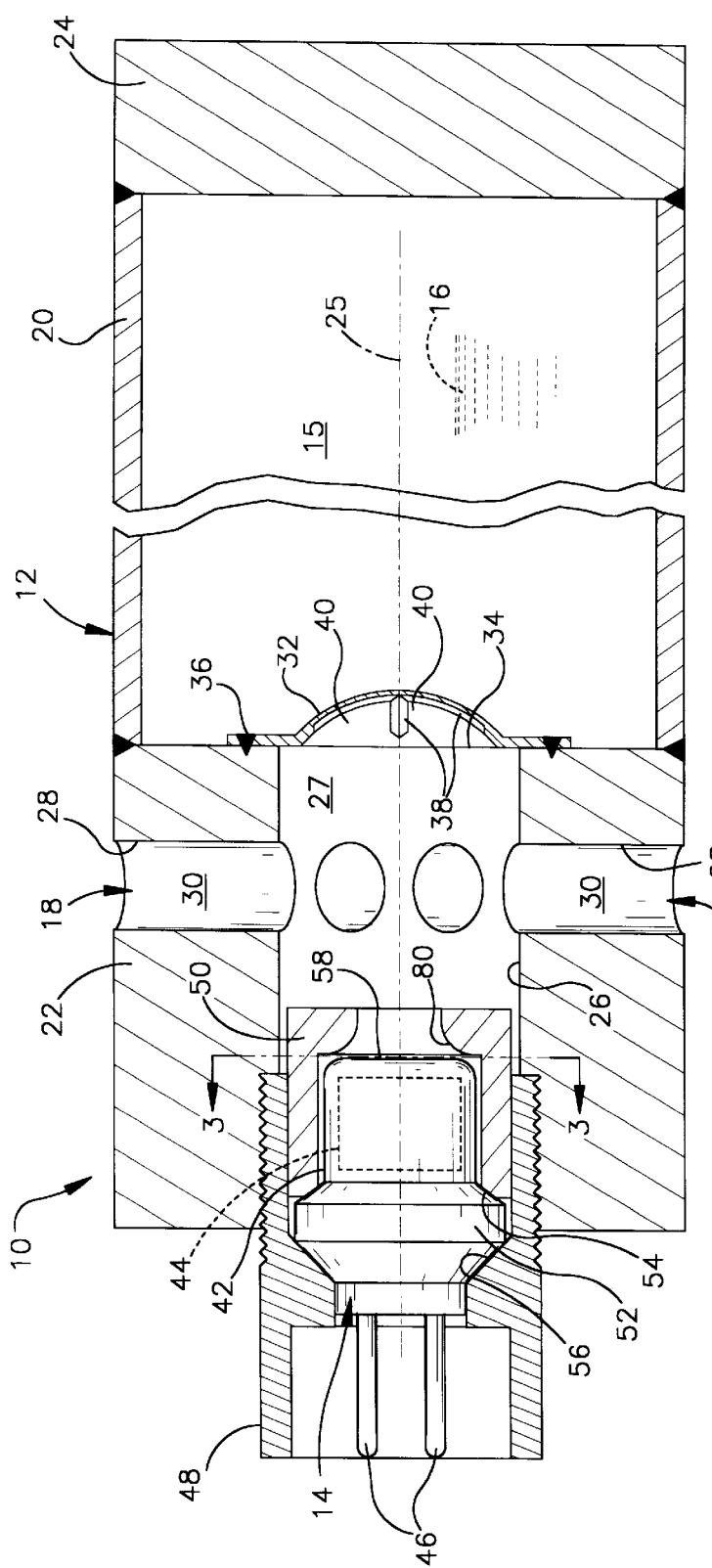
FIG. 1 is a side view, partly in section, of parts of an apparatus comprising a first embodiment of the invention.

FIG. 1 shows parts of an inflator 10 comprising a first embodiment of the present invention. The parts of the inflator 10 that are shown in FIG. 1 include a container 12 and an initiator 14. The container 12 defines a storage chamber 15 containing pressurized inflation fluid 16 for an inflatable vehicle occupant protection device (not shown). Such protection devices include, for example, air bags, inflatable seat belts, inflatable knee bolsters, inflatable head liners and side curtains, and knee bolsters operated by inflatable air bags. When the initiator 14 is actuated, it initiates an outlet flow of inflation fluid from the storage chamber 15. The outlet flow of inflation fluid emerges from the container 12 through a plurality of outlet openings 18.

The container 12 in the first embodiment of the invention is a cylindrical structure defined by a tubular side wall 20, a cylindrical end cap 22, and a circular end wall 24, each of which is centered on a longitudinal axis 25. A cylindrical inner surface 26 of the end cap 22 defines a longitudinally extending passage 27 which also is centered on the axis 25. A plurality of additional cylindrical inner surfaces 28 define a corresponding plurality of radially extending passages 30. The radially extending passages 30 communicate the central passage 27 with the outlet openings 18.

A closure disk 32 extends across an inner end 34 of the central passage 27. The closure disk 32 is fixed and sealed to the end cap 22 by a circumferentially extending weld 36 so as to close the storage chamber 15 at that location. As known in the art, the closure disk 32 preferably has a plurality of radially extending score lines 38. The score lines 38 delineate petal shaped sections 40 of the closure disk 32 that are separated from each other upon rupturing of the closure disk 32 along the score lines 38.

The inflation fluid 16 may have any composition and storage pressure suitable for inflating a vehicle occupant protection device. For example, the inflation fluid 16 in the first embodiment comprises helium at a storage pressure within the range of about 4,000 psi to about 7,000 psi. Moreover, the inflator 10 may contain an alternative source of inflation fluid, such as a body of ignitable gas generating material or a combination of pressurized inflation fluid and ignitable material for heating the inflation fluid. The ignitable material could comprise a fuel gas or a combustible mixture of gases. Such a combustible mixture of gases would preferably have a composition in accordance with the invention set forth in U.S. Pat. No. 5,348,344, assigned to TRW Vehicle Safety Systems Inc. However, the inflator in the first embodiment does not contain an ignitable material for heating the inflation fluid 16.

The initiator 14 in the first embodiment is a particular type of electrically actuatable device which is known as a squib. The initiator 14 thus has a cylindrical metal casing 42 containing a charge of pyrotechnic material 44. The pyrotechnic material 44 is ignited in a known manner upon the passage of electric current through the initiator 14 between a pair of electrical leads 46.

A housing 48 and a retainer 50 contain and support the initiator 14 in a position centered on the axis 25.

The housing 48 is a tubular part which is screwed partially into the central passage 27 in the end cap 22. The initiator 14 is received in the housing 48. The retainer 50 also is a tubular part, and extends into the housing 48 concentrically between the housing 48 and the initiator casing 42. The retainer 50 has an interference fit with the housing 48. In this arrangement, a radially enlarged portion 52 of the casing 42 is engaged and retained securely between a pair of opposed surfaces 54 and 56 of the retainer 50 and the housing 48, respectively. An end wall 58 of the casing 42 faces axially toward the burst disk 32.

Figure 2:
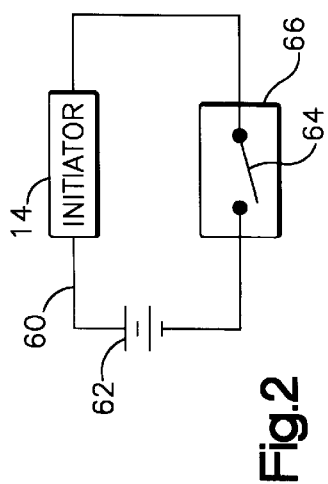
FIG. 2 is a schematic view of an electrical circuit including a part of the apparatus of FIG. 1.

As shown schematically in FIG. 2, the initiator 14 is connected in an electrical circuit 60 with a power source 62 and a normally open switch 64. The switch 64 is part of a sensor 66 that senses a vehicle condition indicating the occurrence of a crash. If the crash-indicating condition is at or above a specified threshold level, it indicates the occurrence of a crash for which inflation of the protection device is desired to help protect an occupant of the vehicle. The switch 64 then closes and electric current is directed through the initiator 14 to ignite the pyrotechnic material 44.

When the pyrotechnic material 44 is ignited, it produces combustion products including heat and hot particles. The combustion products rupture the end wall 58 of the casing 42 and are spewed from the casing 42 toward the closure disk 32. The closure disk 32 ruptures under the influence of both the combustion products and the storage pressure of the inflation fluid 16 in the storage chamber 15. The inflation fluid 16 is thus released to flow outward from the storage chamber 15 through the inner end 34 of the central passage 27, and further outward from the central passage 27 through the radially extending passages 30 and the outlet openings 18.

As described above, the inflator 10 in the first embodiment of the invention does not contain ignitable material for heating the inflation fluid 16. Therefore, when the burst disk 32 ruptures, the unheated inflation fluid flows 16 outward from the storage chamber 15 at flow rates that are determined by the pressure in the storage chamber 15. The pressure in the storage chamber 15 continuously decreases from the storage level to the ambient atmospheric level as the unheated inflation fluid 16 flows outward.

Figure 3:
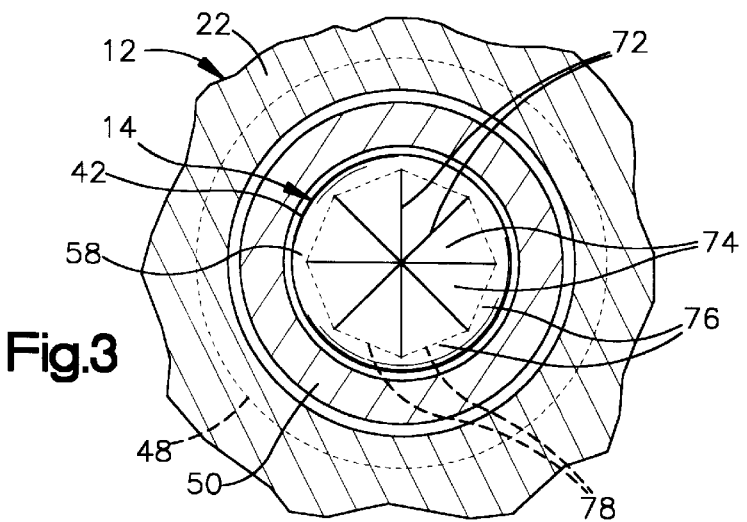
FIG. 3 is a view taken on line 3—3 of FIG. 1.

As shown in FIG. 3, the end wall 58 of the initiator casing 42 also has a plurality of radially extending score lines 72. Like the score lines 38 in the closure disk 32, the score lines 72 in the end wall 58 delineate a plurality of petal shaped sections 74 of the end wall 58 that are separated from each other upon rupturing of the end wall 58 along the score lines 72. Specifically, the end wall 58 is circular and has a plurality of peripheral sections 76, each of which is located radially outward of a corresponding petal shaped section 74. When the end wall 70 is ruptured along the score lines 72, the petal shaped sections 74 are deflected axially outward of the casing 42. The petal shaped sections 74 then diverge radially by deflecting pivotally about the peripheral sections 76. Such deflection occurs generally along fold lines 78 that form between the petal shaped sections 74 and the peripheral sections 76 of the end wall 58.

The retainer 50 helps to inhibit fragmentation of the end wall 58 when the petal shaped sections 74 deflect pivotally about the peripheral sections 76 in the foregoing manner. As shown in FIG. 1, the retainer 50 has an annular inner surface 80 located axially adjacent to the end wall 58. The inner surface 80 of the retainer 50 has an arcuate radial profile which is convex relative to the end wall 58, and projects radially inward past the peripheral sections 76 (FIG. 3) of the end wall 58. The inner surface 80 is thus configured to receive the petal shaped sections 74 of the end wall 58 when they deflect pivotally about the peripheral sections 76, and to limit such pivotal deflection to amounts less than 90 degrees. This helps to prevent tearing and severing of the petal shaped sections 74 that might otherwise occur along the fold lines 78 upon more extensive deflection of the petal shaped sections 74. By preventing the petal shaped section 74 from being severed from the end wall 58, the retainer 50 enables the inflator 10 to be free of a filter for capturing the petal shaped sections 74 in an outlet flow of the inflation fluid 16 between the storage chamber 15 and the outlet openings 18, as shown in FIG. 1.

Figure 4:
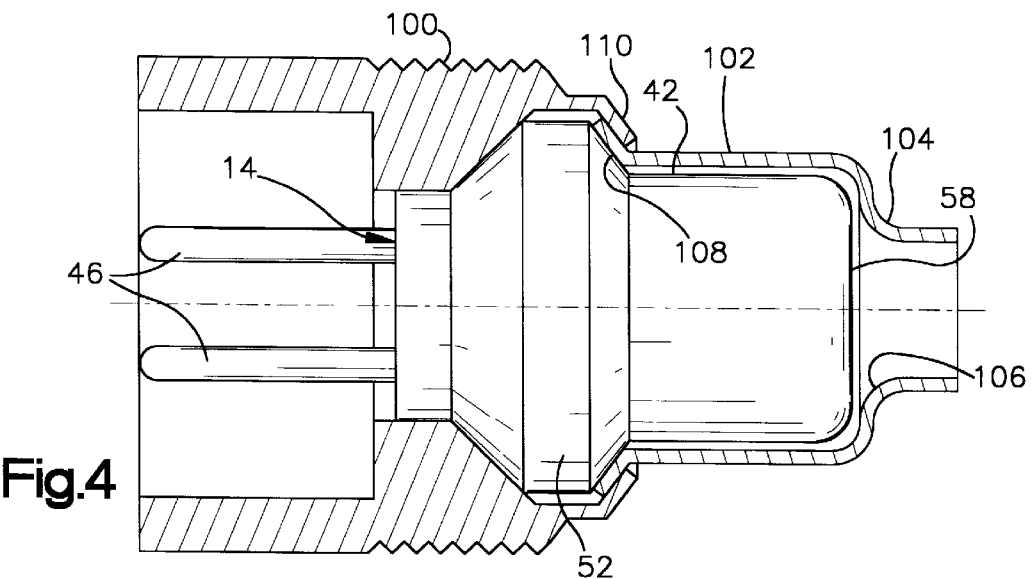
FIG. 4 is a side view, partly in section, of parts of an apparatus comprising a second embodiment of the invention.

Parts of a second embodiment of the present invention are shown in FIG. 4. In the second embodiment, the inflator 10 of FIG. 1 includes an alternative housing 100 and an alternative retainer 102 for the initiator 14. The retainer 102 is a thin-walled tubular part with a necked-down outer end portion 104. The outer end portion 104 of the retainer 102 defines a retainer surface 106 like the retainer surface 80 described above. An inner end portion 108 of the retainer 102 is clamped between a crimped annular rim portion 110 of the housing 100 and the radially enlarged portion 52 of the initiator casing 42.

Figure 5:
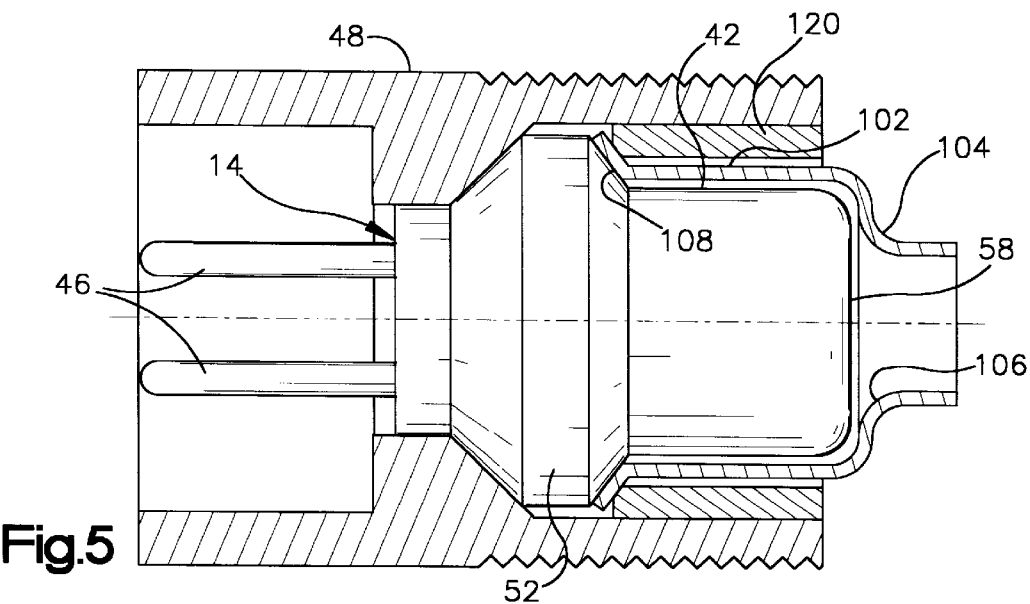
FIG. 5 is a side view, partly in section, of parts of an apparatus comprising a third embodiment of the invention.

The housing 48 of the first embodiment and the retainer 102 of the second embodiment can be used in a third embodiment of the present invention, as shown in FIG. 5. In the third embodiment, the retainer 102 and the initiator 14 are retained in the housing 48 by a tubular insert 120. The insert 120 abuts the inner end portion 108 of the retainer 102, and is received concentrically between the housing 48 and the retainer 102 in an interference fit with the housing 48.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   an initiator having a casing containing a charge of pyrotechnic material, said casing having an end wall with score lines delineating petal shaped sections of said end wall, said petal shaped sections being configured to diverge by deflecting pivotally upon rupturing of said end wall along said score lines under the influence of said pyrotechnic material; and
   a petal retainer structure having a retainer surface configured to receive said petal shaped sections of said end wall so as to limit said pivotal deflection of said petal shaped sections to amounts less than 90 degrees, whereby said petal retainer structure is configured to inhibit fragmentation of said end wall that might otherwise occur upon greater pivotal deflection of said petal shaped sections.

2. Apparatus as defined in claim 1 wherein said retainer surface has an arcuate profile which is convex relative to said end wall of said casing.

3. Apparatus as defined in claim 1 wherein said petal retainer structure is tubular and is configured to fit closely over said casing.

4. Apparatus as defined in claim 1 wherein said casing and said petal retainer structure are parts of an inflator having a storage chamber storing pressurized inflation fluid, said end wall of said casing adjoining an outlet fluid flow path extending from said storage chamber to the exterior of said inflator.

5. Apparatus as defined in claim 4 wherein said inflator is free of a filter in said outlet fluid flow path.

6. Apparatus comprising:
   an initiator having a casing containing a charge of pyrotechnic material, said casing having a circular end wall with radially extending score lines delineating petal shaped sections of said end wall, said petal shaped sections of said end wall being configured to diverge by deflecting pivotally about corresponding peripheral portions of said end wall upon rupturing of said end wall along said score lines under the influence of said pyrotechnic material; and a petal retainer structure having a retainer surface located axially adjacent to said end wall in the path of pivotal movement of said petal shaped sections of said end wall, said retainer surface having an arcuate radial profile projecting radially inward past said peripheral portions of said end wall.

7. Apparatus as defined in claim 6 wherein said arcuate radial profile is convex relative to said end wall.

8. Apparatus as defined in claim 6 wherein said petal retainer structure is tubular and is received closely over said casing.

9. Apparat us a s defined in claim 6 wherein said casing and said petal retainer structure are parts of an inflator having a storage chamber storing pressurized inflation fluid, said end wall of said casing adjoining an outlet fluid flow path extending from said storage chamber to the exterior of said inflator.

10. Apparatus as defined in claim 9 wherein said inflator is free of a filter in said outlet fluid flow path.

11. Apparatus comprising:

a container defining a volume for containing inflation fluid, said container having an outlet in fluid communication with said volume;

a closure disc connected to said container, said closure disc blocking flow of said inflation fluid through said outlet;

an initiator actuatable to rupture said closure disc, said closure disc permitting said inflation fluid to flow from said container through said outlet when said closure disc is ruptured, said initiator having a casing containing a charge of pyrotechnic material, said casing having an end wall with score lines delineating petal shaped sections of said end wall, said petal shaped sections being configured to diverge by deflecting pivotally upon rupturing of said end wall along said score lines under the influence of said pyrotechnic material; and a petal retainer structure having a retainer surface configured to receive said petal shaped sections of said end wall so as to limit said pivotal deflection of said petal shaped sections to amounts less than 90 degrees, whereby said petal retainer structure is configured to inhibit fragmentation of said end wall that might otherwise occur upon greater pivotal deflection of said petal shaped sections.

\* \* \* \* \*